(12) United States Patent
Ciliske et al.

(10) Patent No.: US 7,621,737 B2
(45) Date of Patent: Nov. 24, 2009

(54) DIE WITH INSERT AND GAS PURGING METHOD FOR DIE

(75) Inventors: Scott L. Ciliske, St. Paul, MN (US); Mikhail L. Pekurovsky, Bloomington, MN (US); Steven D. Solomonson, Shoreview, MN (US); Stephen M. Bertling, Saint Louis Park, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 335 days.

(21) Appl. No.: 11/458,564

(22) Filed: Jul. 19, 2006

(65) Prior Publication Data

US 2008/0018009 A1    Jan. 24, 2008

(51) Int. Cl.
B29C 47/14 (2006.01)
B29C 33/10 (2006.01)

(52) U.S. Cl. .................................. 425/467; 264/39
(58) Field of Classification Search ............ 425/467; 264/39
See application file for complete search history.

(56) References Cited

U.S. PATENT DOCUMENTS

| | | | |
|---|---|---|---|
| 2,904,830 A * | 9/1959 | Mulrooney, Jr. | 425/376.1 |
| 4,192,637 A * | 3/1980 | Chong | 425/140 |
| 4,268,239 A * | 5/1981 | Herrington, Jr. | 425/467 |
| 4,411,614 A | 10/1983 | Feathers | |
| 4,797,083 A * | 1/1989 | Reifenhauser | 425/378.1 |
| 5,211,898 A | 5/1993 | Shinmoto | |
| 5,234,330 A | 8/1993 | Billow et al. | |
| 5,273,595 A | 12/1993 | Tomic et al. | |
| 5,329,964 A | 7/1994 | Derezinski | |
| 5,506,000 A | 4/1996 | Leonard | |
| 5,516,273 A | 5/1996 | Delmore et al. | |
| 5,750,159 A | 5/1998 | Delmore et al. | |
| 5,997,645 A | 12/1999 | Grimmel et al. | |
| 6,117,237 A | 9/2000 | Yapel et al. | |
| 6,367,776 B1 | 4/2002 | Lippert et al. | |
| 6,368,547 B1 * | 4/2002 | Visscher | 264/558 |
| 6,767,492 B2 | 7/2004 | Norquist et al. | |
| 2004/0228972 A1 | 11/2004 | Pekurovsky et al. | |

FOREIGN PATENT DOCUMENTS

JP 2634440 4/1997
KR 10-2006-0009935 2/2006

* cited by examiner

Primary Examiner—Philip C Tucker
Assistant Examiner—Alison Hindenlang
(74) Attorney, Agent, or Firm—James A. Baker

(57) ABSTRACT

A die assembly includes a die housing having a multiplicity of inner wall sections defining a die cavity, an inlet passageway passing through the die housing in fluid communication with the die cavity, and an outlet passageway passing through the die housing in fluid communication with the die cavity at a position distal from the inlet passageway. The die assembly also includes an insert removably received in the die cavity. The insert includes a body portion having a multiplicity of outer wall sections, and at least one flow channel is formed between at least one inner wall section of the die housing and each opposite outer wall section of the body portion of the insert; fluid communicates between the external supply and each of the flow channels and the outlet passageway. Also provided is a die insert and a method of purging gas from a die having an insert.

25 Claims, 4 Drawing Sheets

DIE WITH INSERT AND GAS PURGING METHOD FOR DIE

TECHNICAL FIELD

This disclosure relates to a die assembly for extrusion of fluids, and more particularly, to die inserts and methods useful in liquid coating processes using extrusion dies.

BACKGROUND

Fluid extrusion dies are used in manufacturing processes to make a variety of goods. Some dies, for example, are used to form thin films, bars or other elongated shapes of plastic material. Other dies are used to apply a coating of fluent material to a moving web. A number of different coating dies have been constructed to apply a liquid or semi-liquid material to a moving web. In general, such dies receive the liquid or semi-liquid material under pressure from a pump or other device, and distribute the material to regions across the width of the web as the web is advanced in directions along its longitudinal axis.

Many conventional dies have an inlet passageway, an outlet passageway and an inner cavity that extends between the inlet passageway and the outlet passageway. The outlet passageway is relatively wide and often approximates the width of the web in instances where the die has a slot-type outlet for discharging a ribbon of fluid onto the web. The inner cavity is also relatively wide, and serves as a manifold to distribute incoming fluid from the inlet passageway to various regions of the outlet passageway.

Some coating dies, known as slot dies, include an outlet passageway in the form of a transverse slot that discharges the fluid material in a sheet-like bead on a continuous substrate or web. A typical slot coating die has an internal cavity that is used to distribute liquid across the width of a moving web such that it can be uniformly coated with the liquid. The profile of the cavity is chosen to provide the necessary cross-web uniformity for a range of liquids and desired feed rates used in production of coated articles. Similarly, the width of the cavity is chosen so that the die is able to coat the widest webs that can be threaded through the coater head.

For some coating applications it is desirable to use the central portion of the slot to distribute liquid as a strip across a narrower width of a wider substrate web or alternatively, across the entire width of a web that is appreciably narrower than the nominal width of the die. In such cases, the effective width of the slot can be reduced with additional deckles or a cut shim positioned across the slot. Partial or full die inserts can also be used to reduce the effective slot width.

SUMMARY OF THE DISCLOSURE

In general, embodiments of the present disclosure relate to a die assembly including a die insert for use in forming a sheet of fluent material. Embodiments of the present disclosure also relate to a method of purging gas from a die assembly having a die insert, for example, during start-up of an extrusion die in a liquid coating process.

In one aspect, embodiments of the present disclosure provide a die assembly comprising a die housing having one or more inner wall sections defining a die cavity, an inlet passageway passing through the die housing in fluid communication with the die cavity, and an outlet passageway passing through the die housing in fluid communication with the die cavity at a position distal from the inlet passageway. An insert is removably received in the die cavity, the insert comprising a body portion having a plurality of outer wall sections, and at least one flow channel is formed between at least one inner wall section of the die housing and each opposite outer wall section of the body portion of the insert. The die assembly includes a means for providing fluid communication between an external supply of fluent material and each of the at least one flow channel and the outlet passageway. In exemplary embodiments, the inlet passageway is adapted to selectively connect to an external supply of fluent material.

In some exemplary embodiments, the means for providing fluid communication may include a first conduit passing through at least part of the body portion of the insert in fluid communication between the inlet passageway and the outlet passageway, and a second conduit passing through the die housing in fluid communication with each flow channel and the outlet passageway. The first and second conduits may each be adapted to selectively connect to the external supply of fluent material.

In another aspect, embodiments of the present disclosure provide a die assembly comprising an insert removably received within a die housing having at least one inner wall section defining a die cavity. An inlet passageway passes through the die housing in fluid communication with the die cavity, and an outlet passageway passes through the die housing in fluid communication with the die cavity at a position distal from the inlet passageway. In some embodiments, the inlet passageway is adapted to selectively connect to an external supply of fluent material.

In certain exemplary embodiments, the insert comprises a body portion having a plurality of outer wall sections, and at least one flow channel is formed between at least one inner wall section of the die housing and each opposite outer wall section of the body portion of the insert. A first conduit passes through at least part of the body portion of the insert, and the first conduit is in fluid communication between the inlet passageway and the outlet passageway. A second conduit passes through at least the die housing, and the second conduit is in fluid communication with each flow channel and the outlet passageway. In some embodiments, the first and second conduits are each adapted to selectively connect to the external supply of fluent material.

In some exemplary embodiments, each of the inlet passageway, the first conduit and the second conduit has a substantially cylindrical cross-section, and the second conduit extends through the inlet passageway of the die housing and at least a portion of the insert concentric with and coaxially around the first conduit. In other exemplary embodiments, the die assembly further comprises a vent passageway having a substantially cylindrical cross-section, and at least a portion of the vent passageway passes through the inlet passageway of the die housing and at least portion of the insert concentric with and coaxially around the first conduit. In certain exemplary embodiments, the second conduit is in fluid communication with the vent passageway and the at least one flow channel.

In another aspect, embodiments of the present disclosure provide an insert for use within a die assembly for forming a sheet of fluent material. The die assembly includes a die housing having a plurality of inner wall sections defining a die cavity, an inlet passageway passing through the die housing in fluid communication with the die cavity, and an outlet passageway passing through the die housing in fluid communication with the die cavity at a position distal from the inlet passageway. In some embodiments, the inlet passageway is adapted to selectively connect to an external supply of fluent material.

In certain exemplary embodiments, the insert comprises a body portion having a plurality of outer wall sections, and the body portion is adapted to be removably positioned within the die cavity. At least one flow channel is formed between at least one outer wall section of the body portion of the insert and each opposite inner wall section of the die housing upon positioning the body portion within the die cavity. The insert further comprises a first conduit passing through at least part of the body portion of the insert, and the first conduit is in fluid communication between the inlet passageway and the outlet passageway. The insert also comprises a second conduit passing through at least the die housing, and the second conduit is in fluid communication with each flow channel and the outlet passageway. In some embodiments, the first and second conduits are each adapted to selectively connect to the external supply of fluent material.

In certain exemplary embodiments, the insert further comprises at least one chamber formed within the insert body. In other exemplary embodiments, the insert further comprises at least one insert cavity formed in the insert body. In some exemplary embodiments, the at least one insert cavity is in fluid communication with one or more of the inlet passageway, the outlet passageway, the second conduit, and the at least one flow channel. In other exemplary embodiments, the at least one insert cavity is in fluid communication with a vent passageway.

In a further aspect, embodiments of the present disclosure provide a method of purging gas from a die assembly including an insert removably positioned within a die cavity of a die housing having a plurality of inner wall sections defining the die cavity, thereby defining at least one flow channel between at least one inner wall section of the die housing and each opposite outer wall section of the body portion of the insert. A first conduit passes through at least part of the body portion of the insert, and the first conduit is in fluid communication between an inlet passageway and an outlet passageway in the die housing. A second conduit passes through at least the die housing, and the second conduit is in fluid communication with each flow channel and the outlet passageway. In some embodiments, the first and second conduits are each adapted to selectively connect to an external supply of fluent material.

In certain embodiments, the method comprises:

(a) providing a first liquid flow from the external supply of fluent material through the second conduit;

(b) continuing the first liquid flow through the second conduit until the second conduit and each flow channel are substantially free of gas; and (c) thereafter providing a second liquid flow from the external supply of fluent material through the first conduit, thereby providing a sheet of fluent material from the outlet passageway. In some embodiments, the method further comprises interrupting the first liquid flow through the second conduit while maintaining the second liquid flow through the first conduit.

The above summary is not intended to describe each illustrated embodiment or every implementation of the present disclosure. The Figures and the Detailed Description that follow more particularly exemplify certain preferred embodiments utilizing the principles disclosed herein and within the scope of the claims.

DETAILED DESCRIPTION

Figure 1A:
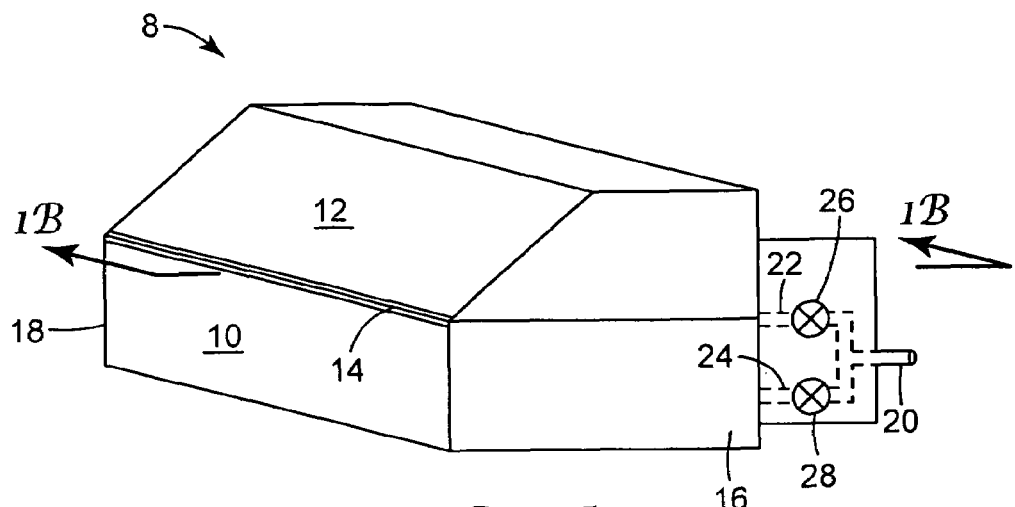
FIG. 1A shows a perspective view of a die assembly according to an illustrative embodiment of the present disclosure.

With respect to the above discussion of extrusion dies, Applicants have discovered that the use of deckles or shims to reduce the width of the coating bead may create problems in installing, operating and maintaining the die in a continuous extrusion process, for example, a continuous extrusion coating process. For example, when the coating liquid contains particulates (e.g. for dispersions), these particulates tend to settle in the areas of the large die cavity where liquid flow is slow, leading to plugging of the die over time and requiring frequent interruptions in the coating process to clean the die. To correct for this, partial or full die inserts may be used to reduce the volume of the die cavity as well as the effective slot width. However, Applicants have also discovered that the use of die inserts may create additional problems in installing, operating and maintaining the die in a continuous extrusion coating process.

Extrusion dies and die inserts are typically built out of metals such as stainless steel for precise dimensional control, good chemical and corrosion resistance, and thermal stability. However, stainless steel dies and die inserts are often too heavy for unaided lifting and positioning within the coating system and the die cavity, respectively. The weight of a die insert and a die containing that insert may be reduced by machining chambers or cavities into the body portion of the insert. However, gases such as air that are temporarily retained within the body portion of the insert, may, during a subsequent coating operation, be entrained in the extruded fluid, producing a void or defect (e.g. a streak) in the resulting extrudate film or coating.

Difficulties may also arise when positioning a closely-fitting die insert inside the die cavity. Small gaps may be formed between the outer wall sections of the body of the die insert and the inner wall sections that define the die cavity within the die housing because of the significant mechanical challenges of providing a perfectly fitted insert for the die cavity. These gaps can trap gas bubbles (e.g. air bubbles) during installation of the insert within the die cavity. Typically with best machining, the gaps between the die and insert are less than 1 mil (25 micrometers). Nevertheless, gases (e.g. air bubbles) may be trapped between the inner walls of the die cavity and the outer wall sections of the insert, and gases trapped in this way may be released over time upon passage of a liquid through the die during extrusion or coating. The bubbles may partially block the entrance to the die slot, causing streaks or voids in the product.

The embodiments may take on various modifications and alterations without departing from the spirit and scope of the disclosure. Accordingly, it is to be understood that the disclosure is not to be limited to the following described embodiments, but is to be controlled by the limitations set forth in the claims and any equivalents thereof. In particular, all numerical values and ranges recited herein are intended to be modified by the term "about", unless stated otherwise. Various embodiments of the disclosure will now be described with reference to the Figures.

Figure 1B:
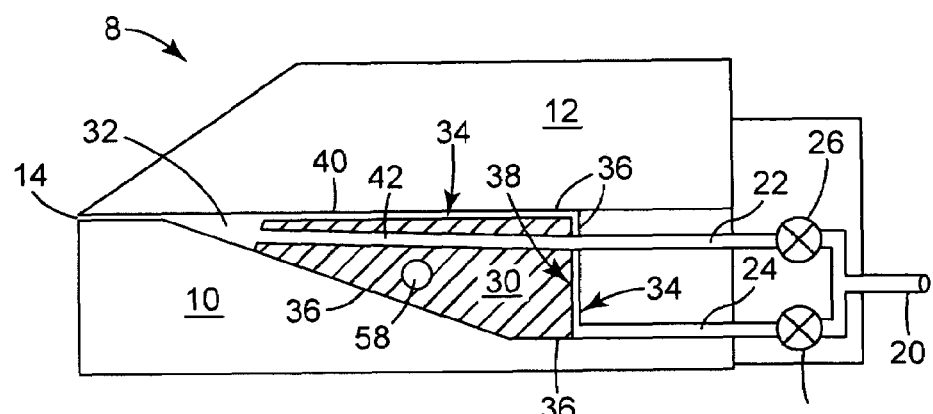
FIG. 1B shows a cross-sectional view of a die assembly including an insert according to an illustrative embodiment of the present disclosure.
Figure 1C:
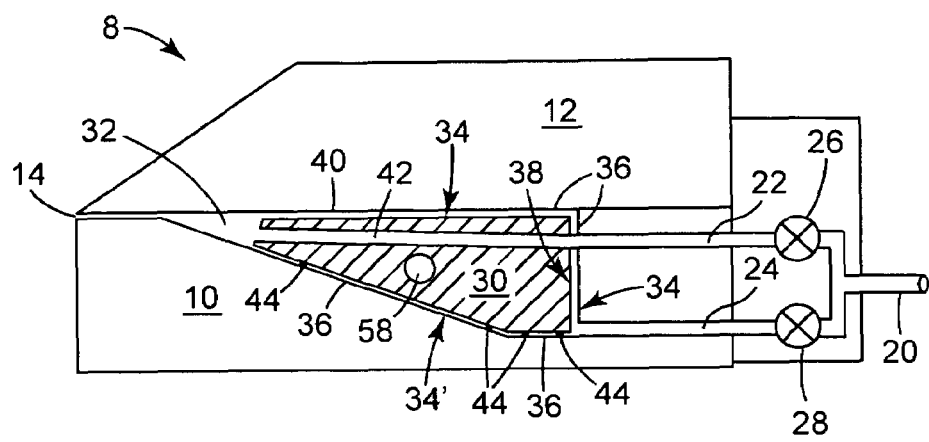
FIG. 1C shows a cross-sectional view of a die assembly including an insert according to another illustrative embodiment of the present disclosure.

Referring to FIGS. 1A-1C, FIG. 1A shows a perspective view of a die assembly 8 according to an illustrative embodiment of the present disclosure. The die assembly 8 includes a die housing 10, an inlet passageway 22 passing through the die housing 10, an outlet passageway 14 (e.g. a slot formed between first transverse side 16 and second transverse side 18 of the die housing 10) passing through the die housing 10 at a position distal from the inlet passageway 22, and a die cover 12. The die assembly 8 also includes an insert (not visible in FIG. 1A) removably received in a die cavity (not visible in FIG. 1A) and forming at least one channel (not visible in FIG. 1A) within the die cavity. The die assembly 8 also includes a means for providing fluid communication between an external supply of fluent material and each of the at least one flow channel and the outlet passageway.

A first conduit (not visible in FIG. 1A) passes through at least part of the insert in fluid communication between the inlet passageway 22 and the outlet passageway 14. A second conduit 24 in fluid communication with each flow channel and the outlet passageway 14, passes through the die housing 10. The first conduit (not shown in FIG. 1A) and second conduit 24 are each adapted to selectively connect to an external supply of fluent material 20. Optional first control valve 26 in fluid communication with the inlet passageway 22 selectively connects the external supply of fluent material 20 to the first conduit (not shown in FIG. 1A). Optional second control valve 28 in fluid communication with the second conduit 24 selectively connects the external supply of fluent material 20 to the second conduit 24.

FIG. 1B shows a cross-sectional view of a die assembly 8 including an insert 30 according to an illustrative embodiment of the present disclosure. The die assembly 8 includes a die housing 10 having a plurality of inner cavity wall sections 36 defining die cavity 32, an inlet passageway 22 passing through the die housing 10 in fluid communication with the die cavity 32, an outlet passageway 14 passing through the die housing 10 in fluid communication with the die cavity 32 at a position distal from the inlet passageway 22, and a die cover 12 forming a ceiling 40 over at least a portion of die cavity 32.

The insert 30 includes a body portion having a plurality of outer wall sections 38, and at least one flow channel 34 formed between at least one inner cavity wall section 36 of die cavity 32 in die housing 10, and each opposite outer wall section 38 of the body portion of insert 30. The die assembly 8 also includes an insert 30 removably received in the die cavity 32, and a means for providing fluid communication between an external supply of fluent material 20 and each of the at least one flow channel 34 and the outlet passageway 14. In some exemplary embodiments, the inlet passageway 22 is adapted to selectively connect to the external supply of fluent material 20.

In some exemplary embodiments, the means for providing fluid communication may include a first conduit 42 passing through at least part of the body portion of the insert 30 in fluid communication between the inlet passageway 22 and the outlet passageway 14, and a second conduit 24 passing through the die housing 10 in fluid communication with each flow channel 34 and the outlet passageway 14. The first conduit 42 and second conduit 24 may each be adapted to selectively connect to the external supply of fluent material 20. Optional first control valve 26 in fluid communication with the inlet passageway 22 selectively connects the external supply of fluent material 20 to the first conduit 42. Optional second control valve 28 in fluid communication with the second conduit 24 selectively connects the external supply of fluent material 20 to the second conduit 24.

In some exemplary embodiments, a chamber 58 is formed within the body portion of the insert 30. The chamber defines a void within the body portion of insert 30. The chamber 58 is preferably not in fluid communication with outlet passageway 14. In certain embodiments, the chamber 58 is not in fluid communication with the external supply of fluent material 20. In some exemplary embodiments, the chamber 58 acts to reduce the weight of die insert 30, thereby simplifying the task of installing and removing the insert within cavity 32 of die housing 10, and in handling the die assembly 8 for installation in a coating apparatus or extruder.

In certain embodiments, the die insert 30 is made slightly undersized relative to the volume of the die cavity 32, thereby creating at least one flow channel 34 having a controlled gap around at least a portion of the insert 30 when the insert 30 is placed within the die cavity 32. In certain exemplary embodiments, the volume occupied by the body portion of the insert 30 is less than the volume of the die cavity 32. In some preferred embodiments, the volume occupied by the body portion of the die insert 30 is at least about 30% of the volume of the die cavity 32 (before installation of the insert 30). In other preferred embodiments, the volume occupied by the body portion of the die insert 30 is at most about 99% by volume of the die cavity 32 (before installation of the insert 30).

In some exemplary embodiments, a portion of one or more of outer wall sections 38 of die insert 30 may have a surface including one or more supports or buttresses (not shown in the figures) which hold or support the insert 30 away from one or more of the opposing inner cavity wall sections 36 of die cavity 32 in die housing 10, thereby defining at least one flow 34 channel defined in the gap between the supported outer wall section 38 and the opposing inner cavity wall section 36. In other exemplary embodiments, a shim or other removable support (not shown in FIGS. 1A-1C) may be inserted between one or more of outer wall sections 38 of die insert 30 and the opposing inner cavity wall sections 36 of die cavity 32 in die housing 10, thereby holding or supporting the insert 30 and defining at least one flow 34 channel formed as the gap between the supported outer wall section 38 and the opposing inner cavity wall section 36.

In certain embodiments, each flow channel 34 defines a gap having a height of at least about 125 micrometers. In other embodiments, each flow channel 34 defines a gap having a height of at most about 12,500 micrometers. The controlled gap between the insert 30 and the plurality of inner cavity wall sections 36 defining die cavity 32 may, in some embodiments, allow liquid to purge gas (e.g. air bubbles) from the die cavity 32 (see FIGS. 1B-1C and FIGS. 2A-2G).

FIG. 1C shows a cross-sectional view of another exemplary embodiment of a die assembly 8. The die assembly 8 includes a die housing 10 having a plurality of inner cavity wall sections 36 defining die cavity 32, an inlet passageway 22 passing through the die housing 10 in fluid communication with the die cavity 32, an outlet passageway 14 passing through the die housing 10 in fluid communication with the die cavity 32 at a position distal from the inlet passageway 22, and a die cover 12 forming a ceiling 40 over at least a portion of die cavity 32.

The die assembly 8 also includes an insert 30 positioned within die cavity 32 of die housing 10 on one or more shims 44. Each shim 44 may be positioned between an outer wall section 38 of the body portion of insert 30 and the opposing inner wall section 36 of die cavity 32, thereby defining at least one flow channel 34. The die assembly 8 also includes an insert 30 removably received in the die cavity 32, and a means for providing fluid communication between an external supply of fluent material 20 and each of the at least one flow channel 34 and the outlet passageway 14. In some exemplary embodiments, the inlet passageway 22 is adapted to selectively connect to the external supply of fluent material 20.

In some exemplary embodiments, the means for providing fluid communication may include a first conduit 42 passing through at least part of the body portion of the insert 30 in fluid communication between the inlet passageway 22 and the outlet passageway 14, and a second conduit 24 passing through the die housing 10 in fluid communication with each flow channel 34 and the outlet passageway 14. The first conduit 42 and second conduit 24 may each be adapted to selectively connect to the external supply of fluent material 20. Optional first control valve 26 in fluid communication with the inlet passageway 22 selectively connects the external supply of fluent material 20 to the first conduit 42. Optional second control valve 28 in fluid communication with the second conduit 24 selectively connects the external supply of fluent material 20 to the second conduit 24.

As shown in FIG. 1C, a first flow channel 34 is formed between the insert 30, and each of inner cavity wall section 36 (e.g. the rear wall) of cavity 32 and ceiling 40 of die cover 12. A second flow channel 34' is also shown between inner cavity wall section 36 (e.g. the floor) of cavity 32, and insert 30. In certain exemplary embodiments, each flow channel 34 and 34' is in fluid communication between the second fluid conduit 24 and the outlet passageway 14.

In some exemplary embodiments, a chamber 58 is formed within the body portion of the insert 30. The chamber defines a void within the body portion of insert 30. The chamber 58 is preferably not in fluid communication with outlet passageway 14. In certain embodiments, the chamber 58 is not in fluid communication with the external supply of fluent material 20. In some exemplary embodiments, the chamber 58 acts to reduce the weight of die insert 30, thereby simplifying the task of installing and removing the insert within cavity 32 of die housing 10, and in handling the die assembly 8 for installation in a coating apparatus or extruder.

In other exemplary embodiments, an insert 30 for use within a die assembly 8 for forming a sheet of fluent material is provided. FIGS. 2A-2G illustrate a die assembly 8 including an insert 30 according to an illustrative embodiment of the present disclosure. The die assembly 8 includes a die housing 10 having a plurality of inner cavity wall sections 36 defining die cavity 32, an inlet passageway 22 passing through the die housing 10 in fluid communication with the die cavity 32, an outlet passageway 14 passing through the die housing 10 in fluid communication with the die cavity 32 at a position distal from the inlet passageway 22, and a die cover (not shown in FIGS. 2A-2G) forming a ceiling 40 over at least a portion of die cavity 32.

The insert 30 is removably received in the die cavity 32. The insert 30 includes a body portion having a plurality of outer wall sections 38, and at least one flow channel 34 formed between at least one inner cavity wall section 36 of die cavity 32 in die housing 10, and each opposite outer wall section 38 of the body portion of insert 30. The die assembly 8 also includes an insert 30 removably received in the die cavity 32, and a means for providing fluid communication between an external supply of fluent material 20 and each of the at least one flow channel 34 and the outlet passageway 14. In some exemplary embodiments, the inlet passageway 22 is adapted to selectively connect to the external supply of fluent material 20.

In some exemplary embodiments, the means for providing fluid communication may include a first conduit 42 passing through at least part of the body portion of the insert 30 in fluid communication between the inlet passageway 22 and the outlet passageway 14, and a second conduit 24 passing through the die housing 10 in fluid communication with each flow channel 34 and the outlet passageway 14. The first conduit 42 and second conduit 24 may each be adapted to selectively connect to the external supply of fluent material 20. Optional first control valve 26 in fluid communication with the inlet passageway 22 selectively connects the external supply of fluent material 20 to the first conduit 42. Optional second control valve 28 in fluid communication with the second conduit 24 selectively connects the external supply of fluent material 20 to the second conduit 24.

In some exemplary embodiments illustrated in FIGS. 2A-2G, first conduit 42, in fluid communication between the inlet passageway 22 and the outlet passageway 14, passes through at least part of the body portion of insert 30. In certain exemplary embodiments, second conduit 24, in fluid communication with each flow channel 34 and the outlet passageway 14, passes through the die housing 10. The insert 30 may include one or more optional insert cavity 50. The insert cavity 50 may be in fluid communication between each flow channel 34. The first conduit 42 and second conduit 24 may each be adapted to selectively connect to an external supply of fluent material 20. For example, optional first control valve 26 in fluid communication with the inlet passageway 22 selectively connects the external supply of fluent material 20 to the first conduit 42. Optional second control valve 28 in fluid communication with the second conduit 24 selectively connects the external supply of fluent material 20 to the second conduit 24.

In additional exemplary embodiments, the die assembly 8 includes a vent passageway 54 in fluid communication with the second conduit 24 and at least one flow channel 34. In certain embodiments illustrated by FIGS. 2A-2G, the vent passageway 54 and the second conduit 24 each has a substantially cylindrical cross-section, and vent passageway 54 is positioned concentric with and coaxially around inlet passageway 22. The vent passageway 54 may also be in fluid communication with outlet passageway 14. Vent passageway 54 may be selectively vented to the external environment, for example, to purge gas from within the die cavity 32. For example, optional vent valve 29 in fluid communication with the vent passageway 54, may selectively regulate flow through the vent passageway 54. Vent passageway 54 may be a separate vent passageway, or alternatively, may be formed as a passageway between the inlet passageway 22 and at least a portion of the first conduit 42 (as shown in FIGS. 2A-2G), or between a portion of the first conduit 42 and the second conduit 24 (as described below with respect to FIG. 3).

In certain exemplary embodiments, the insert 30 may include at least one chamber (not shown in FIGS. 2A-2G) within the body portion of the insert 30. In some exemplary embodiments, the insert 30 may additionally or alternatively include at least one insert cavity 50 formed within the body portion of the insert 30. In some embodiments, the at least one insert cavity 50 may be in fluid communication with one or more of the inlet passageway 22, the outlet passageway 14, the second conduit 24, and the at least one flow channel 34. In the illustrative embodiment shown in FIGS. 2A-2G, the insert cavity 50 is formed in the body portion of insert 30 in fluid communication with the vent passageway 54, the outlet passageway 14, the inlet passageway 22, the second conduit 24, and the flow channel 34.

In some exemplary embodiments, the vent passageway 54 may provide a path for venting air from an insert cavity 50 formed in the body portion of the die insert 30. In certain exemplary embodiments illustrated in FIGS. 2A-2G, the vent passageway 54 has an upper end proximate an upper body portion of the insert 30, and the wall of the vent passageway 54 has at least one perforation 52 near the upper end, whereby fluent material may pass from the insert cavity 50 through the at least one perforation 52 and into the vent passageway 54. This path may be open during die start-up while filling the die cavity 32 with fluent material, and may be closed after the purging of air is complete. For example, the die insert 30 and die assembly 8 shown in FIG. 2 may enable liquid to be pumped into each flow channel 34 formed between at least one inner cavity wall section 36 of die cavity 32 in die housing 10, and each opposite outer wall section 38 of the body portion of insert 30, thereby displacing (i.e. purging) gas (e.g. air) from the die cavity 32 and any optional insert cavities 50 formed within the body portion of the insert 30.

Figure 3:
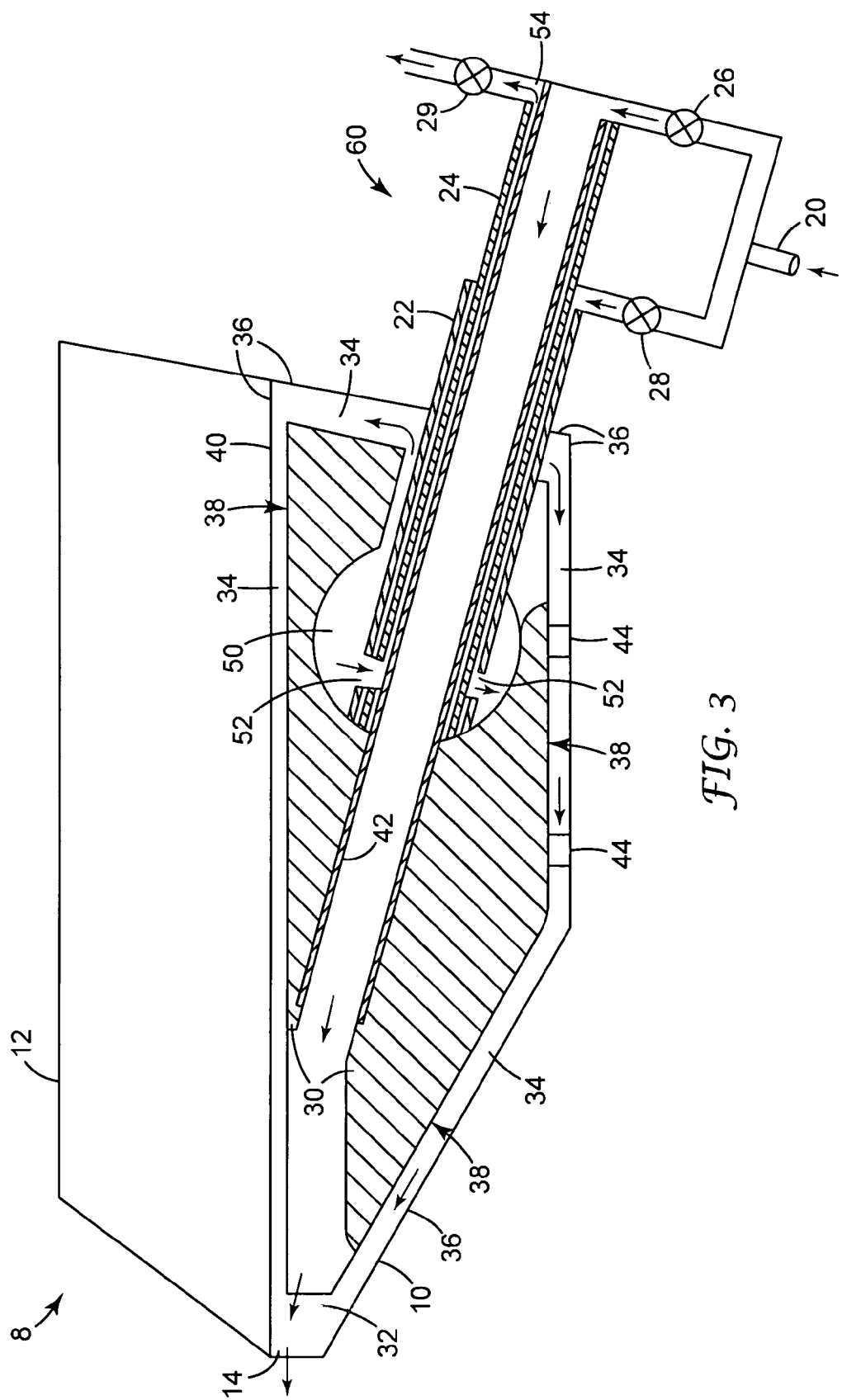
FIG. 3 illustrates a partial cross-sectional view of a die assembly including an exemplary insert according to an additional illustrative embodiment of the present disclosure.

In other embodiments illustrated in FIG. 3, a conduit assembly 60 (e.g. a "lance" made of pipes or tubes) passes through the inlet passageway 22 in the die housing 10 and penetrates the die insert 30 and the exterior of the die to form a path that can vent gases such as air bubbles from around and within the insert 30 to outside of the die housing 10. In certain embodiments, the use of a conduit assembly 60 in the form of a "lance" permits use of the existing inlet passageway 22 in the die housing 10 to provide fluent material from an external source of fluent material 20 to the first conduit 42 formed within the die insert 30, and ultimately to the exit passageway 14, without significant modification to the die housing 10. In some embodiments, the conduit assembly 60 permits removal of trapped gases (e.g. air) between the outer wall sections 38 of body portion of insert 30 and the inner walls of the die cavity 36, or within one or more cavity 50 formed in the body portion of insert 30.

In one exemplary embodiment illustrated in FIG. 3, the die assembly 8 includes a die housing 10 having a plurality of inner cavity wall sections 36 defining die cavity 32, an inlet passageway 22 passing through the die housing 10 in fluid communication with the die cavity 32, an outlet passageway 14 passing through the die housing 10 in fluid communication with the die cavity 32 at a position distal from the inlet passageway 22, and a die cover 12 forming a ceiling 40 over at least a portion of die cavity 32. The die assembly 8 also includes an insert 30 positioned within die cavity 32 of die housing 10 on one or more shims 44. Each shim 44 may be positioned between an outer wall section 38 of the body portion of insert 30 and the opposing inner wall section 36 of die cavity 32, thereby defining at least one flow channel 34.

The insert 30 is removably received in the die cavity 32. The insert 30 includes a body portion having a plurality of outer wall sections 38, and at least one flow channel 34 formed between at least one inner cavity wall section 36 of die cavity 32 in die housing 10, and each opposite outer wall section 38 of the body portion of insert 30. The die assembly 8 also includes a means for providing fluid communication between an external supply of fluent material 20 and each of the at least one flow channel 34 and the outlet passageway 14. In some exemplary embodiments, the inlet passageway 22 is adapted to selectively connect to the external supply of fluent material 20.

In some exemplary embodiments, the means for providing fluid communication may include a first conduit 42 passing through at least part of the body portion of the insert 30 in fluid communication between the inlet passageway 22 and the outlet passageway 14, and a second conduit 24 passing through the die housing 10 in fluid communication with each flow channel 34 and the outlet passageway 14. The first conduit 42 and second conduit 24 may each be adapted to selectively connect to the external supply of fluent material 20. Optional first control valve 26 in fluid communication with the inlet passageway 22 selectively connects the external supply of fluent material 20 to the first conduit 42. Optional second control valve 28 in fluid communication with the second conduit 24 selectively connects the external supply of fluent material 20 to the second conduit 24.

In exemplary embodiments, first conduit 42, in fluid communication between the inlet passageway 22 and the outlet passageway 14, passes through at least part of the body portion of insert 30. In some exemplary embodiments, second conduit 24, in fluid communication with each flow channel 34 and the outlet passageway 14, passes through the die housing 10. The insert 30 may include one or more optional insert cavity 50 as shown in FIG. 3. The insert cavity 50 may be in fluid communication between each flow channel 34. In additional exemplary embodiments, the first conduit 42 and second conduit 24 are each adapted to selectively connect to an external supply of fluent material 20. For example, optional first control valve 26 in fluid communication with the first conduit 42 selectively connects the external supply of fluent material 20 to the first conduit 42. Optional second control valve 28 in fluid communication with the second conduit 24 selectively connects the external supply of fluent material 20 to the second conduit 24. In some embodiments, control valve 28 is in fluid communication with the inlet passageway 22, which is also in fluid communication with second conduit 24.

In additional exemplary embodiments, the die assembly 8 includes a vent passageway 54 in fluid communication with the second conduit 24 and at least one flow channel 34. In certain embodiments illustrated by FIG. 3, the vent passageway 54 and the second conduit 24 each has a substantially cylindrical cross-section, and vent passageway 54 is positioned concentric with and coaxially within inlet passageway 22. The vent passageway 54 may also be in fluid communication with outlet passageway 14. Vent passageway 54 may be selectively vented to the external environment, for example, to purge gas from within the die cavity 32. For example, optional vent valve 29 in fluid communication with the vent passageway 54, may selectively regulate flow through the vent passageway 54. Vent passageway 54 may be a separate vent passageway, or alternatively, may be formed as a passageway between the inlet passageway 22 and at least a portion of the first conduit 42 (as shown in FIGS. 2A-2G), or between a portion of the first conduit 42 and the second conduit 24 (as described below with respect to FIG. 3).

In certain exemplary embodiments, each of the inlet passageway 22, the first conduit 42, and the second conduit 24 has a substantially cylindrical cross-section. In exemplary embodiments, the second conduit 24 extends through (e.g. within) the inlet passageway 22 of the die housing 10 and at least a portion of the insert 30 concentric with and coaxially around the first conduit 42. In certain exemplary embodiments, the second conduit has a wall, and one or more perforations 52, 52' providing fluid communication between the second conduit and at least one insert cavity 50 formed in the body portion of the insert 30 in fluid communication with the at least one flow channel 34.

In certain exemplary embodiments, the insert 30 may additionally or alternatively include at least one chamber (not shown in FIG. 3) within the body portion of the insert 30. In some exemplary embodiments, the insert 30 may additionally or alternatively include at least one insert cavity 50 formed within the body portion of the insert 30, as shown in FIG. 3. In some embodiments, the at least one insert cavity 50 may be in fluid communication with one or more of the inlet passageway 22, the outlet passageway 14, the second conduit 24, and the at least one flow channel 34. In the illustrative embodiment shown in FIG. 3, the insert cavity 50 is formed in the body portion of insert 30 in fluid communication with the vent passageway 54, the outlet passageway 14, the second conduit 24, and the flow channel 34.

In another aspect, embodiments of the present disclosure provide a method of purging gas from cavity 32 defined in die housing 10 containing insert 30. For example, the die insert 30 and die assembly 8 shown in FIG. 3 may enable liquid to be pumped into each flow channel 34 formed between at least one inner cavity wall section 36 of die cavity 32 in die housing 10, and each opposite outer wall section 38 of the body portion of insert 30, thereby displacing (i.e. purging) gas (e.g. air) from the die cavity 32 and any optional insert cavities 50 formed within the body portion of the insert 30. As one example, vent passageway 54 may be open during die start-up while filling the die cavity 32 with fluent material, and may be closed, in some embodiments, after the purging of gas (e.g. air) is complete.

Other embodiments of the present disclosure provide additional methods of purging gas, such as air, from a die assembly 8 including an insert 30 removably positioned within a die cavity 32 of a die housing 10 having a plurality of inner wall sections 36 defining the die cavity 32, thereby defining at least one flow channel 34 between at least one inner wall section of the die housing 36 and each opposite outer wall section 38 of the body portion of the insert 30. A first conduit 42 passes through at least part of the body portion of the insert 30, and the first conduit 42 is in fluid communication between an inlet passageway 22 and an outlet passageway 14 in the die housing 10. A second conduit 24 passes through at least the die housing 10, and the second conduit 24 is in fluid communication with each flow channel 34 and the outlet passageway 14. In some embodiments, the first conduit 42 and second conduit 24 are each adapted to selectively connect to an external supply of fluent material 20 using, for example, control valves 26 and 28, respectively.

In one exemplary embodiment, the method includes the steps of:

(a) providing a first liquid flow from the external supply of fluent material through the second conduit;

(b) continuing the first liquid flow through the second conduit until the second conduit and each flow channel are substantially free of gas; and (c) thereafter providing a second liquid flow from the external supply of fluent material through the first conduit, thereby providing a sheet of fluent material from the outlet passageway.

In some embodiments, the method further includes interrupting the first liquid flow through the second conduit while maintaining the second liquid flow through the first conduit.

Figure 2A:
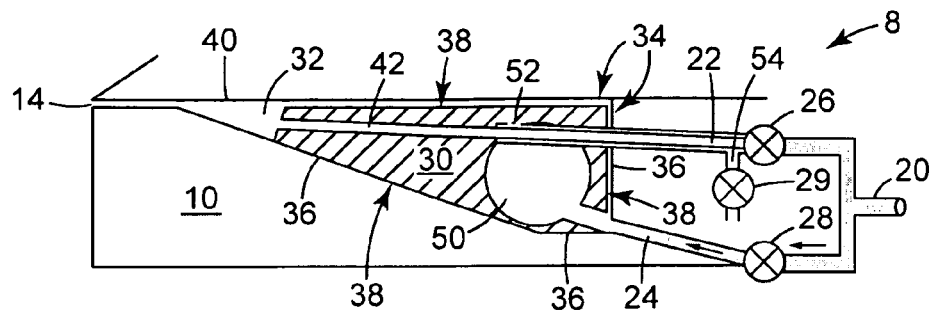
FIGS. 2A-G illustrates partial cross-sectional views of a die assembly including an insert and a related sequence of steps in a method for purging gas from a die according to a further illustrative embodiment of the present disclosure.
Figure 2B:
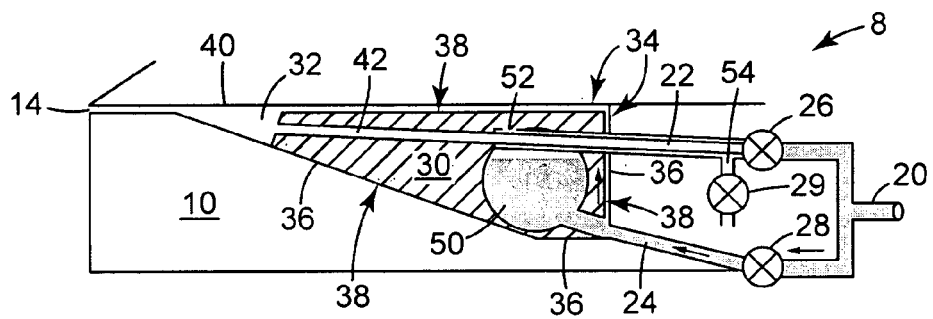
Figure 2C:
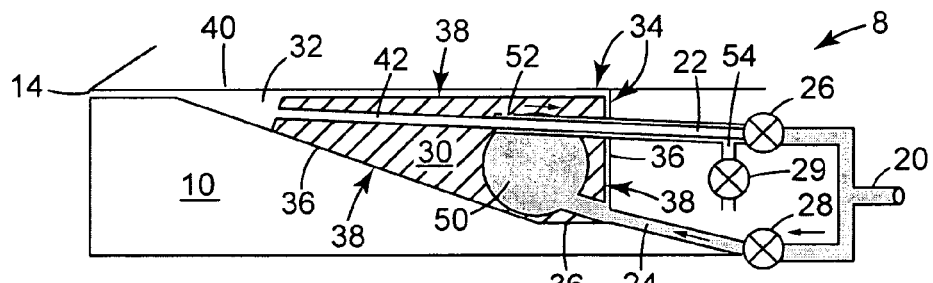
Figure 2D:
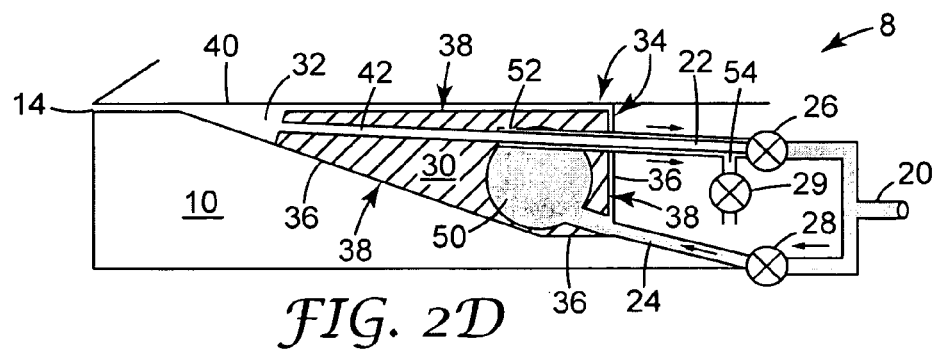

One exemplary embodiment of the method is illustrated by FIGS. 2A-2G. In FIG. 2A, a flow of fluent material (e.g. a coating solution or dispersion, or a polymer melt for extrusion) from an external source 20 through second conduit 24 is initiated by opening control valve 28. Vent valve 29 is preferably open during this step, and control valve 26 is preferably closed. In FIG. 2B, fluent material flows from second conduit 24 into at least one insert cavity 50, thereby displacing gas (e.g. air) from within cavity 50. Fluent material also begins to flow into a portion of flow channel 34, fluent material rising within flow channel 34 with the rising level of fluent material within insert cavity 50, thereby displacing gas from within flow channel 34. In FIG. 2C, fluent material has displaced a substantial portion of the gas from within cavity 50, and fluent material begins to flow through perforation 52 into vent channel 54, thereby displacing gas from within vent channel 54. In FIG. 2D, fluent material has displaced a portion of the gas within vent channel 54.

Figure 2E:
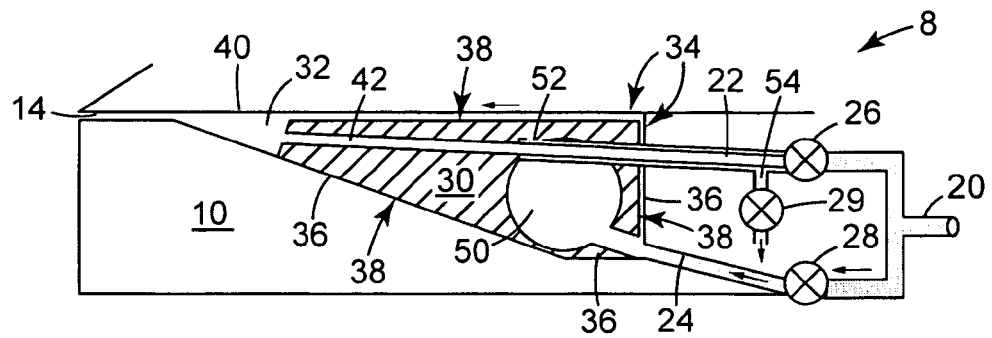
Figure 2F:
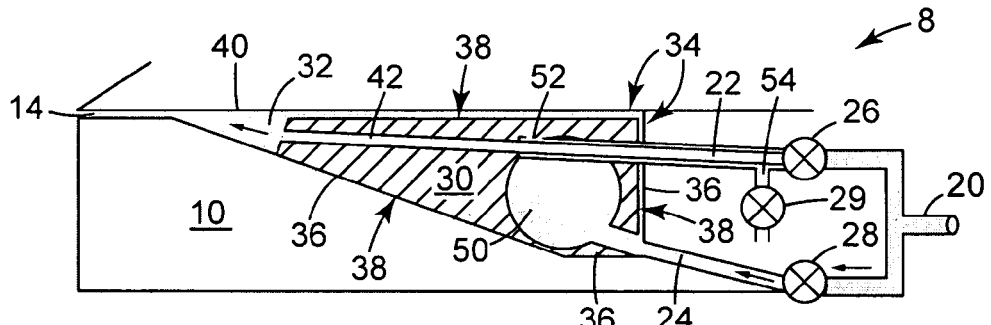
Figure 2G:
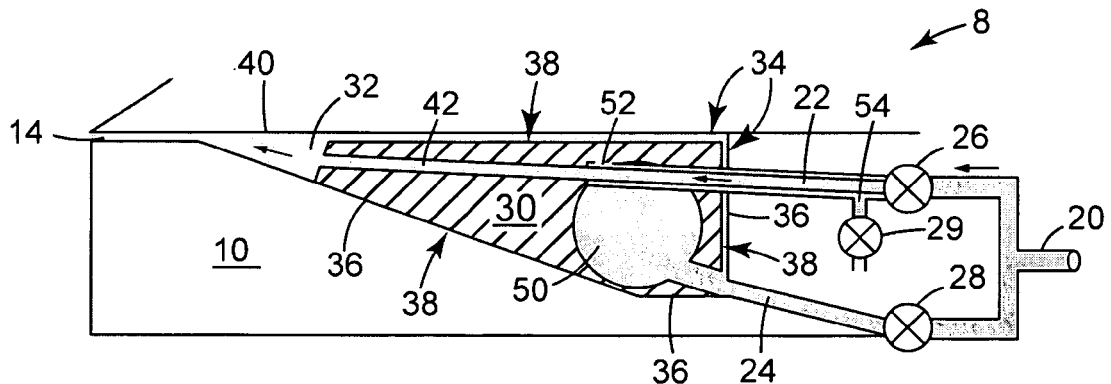

In FIG. 2E, fluent material has displaced a substantial portion of the gas within vent channel 54 and flows out of vent valve 29. After passage of sufficient time such that gas bubbles are no longer observed exiting vent valve 29, vent valve 29 is closed, as shown in FIG. 2F. Fluent material continues to flow into flow channel 34 and out of outlet passageway 14 supplied by second conduit 24 through chamber 50. After passage of sufficient time such that fluent material has displaced a substantial portion of gas from flow channel 34 and filled cavity 32 such that gas bubbles are no longer observed in the fluent material exiting outlet passageway 14, control valve 26 may be opened, thereby permitting fluent material to flow through inlet passageway 22 and into first conduit 42 as shown in FIG. 2G. In some embodiments, control valve 28 may then be closed, while maintaining flow of fluent material through inlet passageway 22, first conduit 42, and out of outlet passageway 14 as a sheet of fluent material useful in coating an article or forming an extruded sheet or film.

Suitable dies useful in practicing the various embodiments of the present disclosure are known to those skilled in the art. Exemplary dies include, for example, extrusion dies used in extrusion coating or melt extrusion of polymer melts. One particularly well-suited die is an extrusion slot die wherein the exit passageway defines a generally rectangular transverse slot formed between the side walls of the die housing. Exemplary conduit materials include, but are not limited to, various pipes, ducts, pipes and tubing known to those skilled in the art. Exemplary die inserts according to the various embodiments of the present disclosure may be fabricated from a variety of materials, for example, metals, such as stainless steel or aluminum, polymers, such a polycarbonate and poly(methyl) methacrylate, and wood.

Some embodiments of the disclosure provide a die including a removable die insert that permits reduction of the cavity volume of the die while using the existing inlet and outlet passageways of the die housing to supply and emit fluent material from an external supply. Other embodiments provide an insert that narrows the width of the die outlet passageway (e.g., slot), thereby permitting application of a narrower strip of fluent material. In other embodiments, the insert fills a substantial portion of the die cavity, thereby reducing the dead volume within the die in which the fluent material may collect. This may be particularly advantageous for dispersions which may undergo sedimentation within the die chamber, or for reactive liquids. A removable die insert may also simplify cleaning of the die chamber.

Other embodiments of the disclosure provide a die insert comprising one or more internal cavities or chambers, thereby reducing the weight of the die insert, which may simplify the task of installing and removing the insert within the die, and in handling the die. Additional embodiments of the disclosure may provide an apparatus and method for purging a gas, such as air, from spaces around and within a die insert, thereby reducing or eliminating the release of gas bubbles into the fluent material exiting the die slot. This may provide the advantage of reducing or eliminating defects, for example, coating defects, caused by bubbles or voids in the extruded fluid material.

It is apparent to those skilled in the art from the above description that various modifications can be made without departing from the scope and principles of this disclosure, and it should be understood that this disclosure is not to be unduly limited to the illustrative embodiments set forth hereinabove. All publications and patents are herein incorporated by reference to the same extent as if each individual publication or patent was specifically and individually indicated to be incorporated by reference. Various embodiments of the disclosure have been described. These and other embodiments are within the scope of the following claims.

We claim:

1. A die assembly for forming a sheet of fluent material comprising:
    a die housing having one or more inner wall sections defining a die cavity, an inlet passageway passing through the die housing in fluid communication with the die cavity, and an outlet passageway passing through the die housing in fluid communication with the die cavity at a position distal from the inlet passageway, wherein the inlet passageway is adapted to selectively connect to an external supply of fluent material;
    an insert removably received in the die cavity, the insert comprising a body portion having a plurality of outer wall sections, wherein at least one flow channel is formed between at least one inner wall section of the die housing and each opposite outer wall section of the body portion of the insert;
    a first conduit passing through at least part of the body portion of the insert, wherein the first conduit is in fluid communication between the inlet passageway and the outlet passageway; and
    a second conduit passing through at least the die housing, wherein the second conduit is in fluid communication with each flow channel and the outlet passageway, and wherein the second conduit is adapted to selectively connect to the external supply of fluent material.

2. The die assembly of claim 1, further comprising at least one insert cavity formed in the body portion of the insert.

3. The die assembly of claim 2, wherein the at least one insert cavity is in fluid communication with one or more of the inlet passageway, the outlet passageway, the second conduit, and the at least one flow channel.

4. The die assembly of claim 1, further comprising at least one chamber formed within the body portion of the insert.

5. The die assembly of claim 1, further comprising a control valve in fluid communication with the first conduit, wherein the control valve is positioned to selectively connect the external supply of fluent material to the first conduit.

6. The die assembly of claim 5, further comprising a second control valve in fluid communication with the second conduit, wherein the second control valve is positioned to selectively connect the external supply of fluent material to the second conduit.

7. The die assembly of claim 1, wherein each flow channel has a height from 125 micrometers to 12,500 micrometers.

8. The die assembly of claim 1, wherein a volume occupied by the body portion of the insert is less than a volume of the die cavity.

9. The die assembly of claim 8, wherein the volume occupied by the body portion of the insert is from 30% to 99% by volume of the volume of the die cavity.

10. The die assembly of claim 1, wherein each of the inlet passageway, the first conduit and the second conduit has a substantially cylindrical cross-section, and wherein the second conduit extends through the inlet passageway of the die housing and at least a portion of the insert concentric with and coaxially around the first conduit.

11. The die assembly of claim 10, wherein the second conduit has a wall, and wherein the wall of the second conduit has at least one perforation providing fluid communication between the second conduit and at least one insert cavity formed in the body portion of the insert, wherein the insert cavity is in fluid communication with the at least one flow channel.

12. The die assembly of claim 11, further comprising a vent passageway in fluid communication with at least one of the inlet passageway and the second conduit.

13. The die assembly of claim 12, further comprising a vent valve in fluid communication with the vent passageway, wherein the vent valve is positioned to selectively regulate flow of the fluent material through at least the vent passageway.

14. The die assembly of claim 12, wherein the vent passageway has a substantially cylindrical cross-section passing through the inlet passageway of the die housing and at least portion of the insert concentric with and coaxially around the first conduit.

15. The die assembly of claim 12, further comprising an insert cavity formed in the body portion of the insert, wherein the insert cavity is in fluid communication between the second conduit and the vent passageway, and further wherein the insert cavity is in fluid communication with at least one flow channel.

16. The die assembly of claim 1, further comprising at least one shim positioned between an outer wall section of the body portion of the insert and an inner wall section of the cavity, thereby forming the at least one flow channel.

17. An insert for use within a die, the die including a die housing having a plurality of inner wall sections defining a die cavity, an inlet passageway passing through the die housing in fluid communication with the die cavity, and an outlet passageway passing through the die housing in fluid communication with the die cavity at a position distal from the inlet passageway, wherein the inlet passageway is adapted to selectively connect to an external supply of fluent material, the insert comprising:
    a body portion having a plurality of outer wall sections, wherein the body portion is adapted to be removably positioned within the die cavity, and wherein at least one flow channel is formed between at least one outer wall section of the body portion of the insert and each opposite inner wall section of the die housing upon positioning the body portion within the die cavity;
    a first conduit passing through at least part of the body portion of the insert, wherein the first conduit is in fluid communication between the inlet passageway and the outlet passageway; and
    a second conduit passing through at least the die housing, wherein the second conduit is in fluid communication with each flow channel and the outlet passageway, and wherein the second conduit is adapted to selectively connect to the external supply of fluent material.

18. The insert of claim 17, further comprising at least one chamber formed within the insert body.

19. The insert of claim 17, further comprising at least one insert cavity formed within the insert body, wherein the at least one insert cavity is in fluid communication with one or more of the inlet passageway, the outlet passageway, the second conduit, and the at least one flow channel.

20. The insert of claim 17, wherein each of the inlet passageway, the first conduit and the second conduit has a substantially cylindrical cross-section, and wherein the second conduit extends through at least a portion of the insert and the inlet passageway of the die housing concentric with and coaxially around the first conduit.

21. The insert of claim 20, wherein the second conduit has a wall, and wherein the wall of the second conduit has at least a first perforation providing fluid communication between the second conduit and the at least one flow channel.

22. The insert of claim 21, further comprising a vent passageway having a substantially cylindrical cross-section passing through the inlet passageway of the die housing and at least a portion of the insert concentric with and coaxially around the first conduit.

23. The insert of claim 22, wherein the second conduit has a wall, and wherein the wall of the second conduit has at least one perforation providing fluid communication between the second conduit and the vent passageway.

24. A method of purging gas from a die assembly including a housing having a plurality of inner wall sections defining a cavity, an inlet passageway passing through the die housing in fluid communication with the die cavity, an outlet passageway passing through the die housing in fluid communication with the die cavity at a position distal from the inlet passageway, wherein the inlet passageway is adapted to selectively connect to an external supply of fluent material;

an insert removably received in the die cavity, the insert comprising a body portion having a plurality of outer wall sections, wherein at least one flow channel is formed between at least one inner wall section of the die housing and each opposite outer wall section of the body portion of the insert;

a first conduit passing through at least a portion of the body portion of the insert, wherein the first conduit is in fluid communication between the inlet passageway and the outlet passageway; and a second conduit passing through the die housing, wherein the second conduit is in fluid communication with each flow channel and the outlet passageway, and wherein the second conduit is adapted to selectively connect to the external supply of fluent material; the method comprising:

(a) providing a first liquid flow from the external supply of fluent material through the second conduit;

(b) continuing the first liquid flow through the second conduit until the second conduit and each flow channel are substantially free of gas; and (c) thereafter providing a second liquid flow from the external supply of fluent material through the first conduit, thereby providing a sheet of fluent material from the outlet passageway.

25. The method of claim 24, further comprising interrupting the first liquid flow through the second conduit while maintaining the second liquid flow through the first conduit.

* * * * *

UNITED STATES PATENT AND TRADEMARK OFFICE
CERTIFICATE OF CORRECTION

PATENT NO. : 7,621,737 B2 Page 1 of 1
APPLICATION NO. : 11/458564
DATED : November 24, 2009
INVENTOR(S) : Ciliske et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 463 days.

Signed and Sealed this

Twenty-sixth Day of October, 2010

David J. Kappos
*Director of the United States Patent and Trademark Office*